(12) United States Patent
Venkatesh et al.

(10) Patent No.: US 12,093,224 B2
(45) Date of Patent: Sep. 17, 2024

(54) CONTEXT-BASED INTELLIGENT PLACEMENT OF FILES IN AGGREGATED CLOUD STORAGE

(71) Applicant: Dell Products L.P., Round Rock, TX (US)

(72) Inventors: Ramanujam Venkatesh, Bangalore (IN); Gokul Thiruchengode Vajravel, Bangalore (IN); Sudhakar Ramasamy, Salem (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/164,670

(22) Filed: Feb. 6, 2023

(65) Prior Publication Data
US 2024/0264982 A1    Aug. 8, 2024

(51) Int. Cl.
*G06F 16/00* (2019.01)
*G06F 16/11* (2019.01)
*G06F 16/17* (2019.01)
*G06F 16/182* (2019.01)
*G06F 16/188* (2019.01)
*H04L 67/10* (2022.01)

(52) U.S. Cl.
CPC .......... *G06F 16/183* (2019.01); *G06F 16/119* (2019.01); *G06F 16/1734* (2019.01); *G06F 16/188* (2019.01); *H04L 67/10* (2013.01)

(58) Field of Classification Search
CPC .. G06F 16/183; G06F 16/119; G06F 16/1734; G06F 16/188; H04L 67/10

USPC ......................................................... 707/827
See application file for complete search history.

(56) References Cited

U.S. PATENT DOCUMENTS

| | | | | |
|---|---|---|---|---|
| 5,564,037 A | * | 10/1996 | Lam | G06F 12/08 707/999.204 |
| 8,336,047 B2 | * | 12/2012 | Van Hensbergen | G06F 9/5072 709/226 |
| 11,715,051 B1 | * | 8/2023 | Baskaran | G06F 16/90335 707/758 |
| 2003/0046396 A1 | * | 3/2003 | Richter | G06F 11/3433 709/226 |
| 2009/0307245 A1 | * | 12/2009 | Mullen | G06F 16/119 |
| 2010/0050173 A1 | * | 2/2010 | Hensbergen | H04L 61/4511 718/104 |
| 2010/0274983 A1 | * | 10/2010 | Murphy | G06F 11/1456 711/170 |
| 2015/0019737 A1 | * | 1/2015 | Kim | H04L 47/70 709/226 |
| 2017/0126504 A1 | * | 5/2017 | Fang | H04L 67/10 |

(Continued)

*Primary Examiner* — Vincent F Boccio
(74) *Attorney, Agent, or Firm* — Kirton McConkie; Brian Tucker (57) ABSTRACT

Context-based intelligent placement of files in aggregated cloud storage is provided. A virtual volume can be created to provide an aggregated interface for accessing aggregated cloud storage. When the user attempts to create a file on the virtual volume, the virtual volume can employ a placement algorithm to intelligently select one of the aggregated cloud storage providers to which the request to create the file will be directed. The placement algorithm can consider context of the aggregated cloud storage providers, network metrics, and other factors in its selection. In this way, the aggregated cloud storage can be efficiently used while maximizing the user experience.

18 Claims, 9 Drawing Sheets

(56) References Cited

U.S. PATENT DOCUMENTS

2018/0196832 A1\* 7/2018 Maybee .............. G06F 9/5077
2019/0173765 A1\* 6/2019 Bertran .............. H04L 41/147
2020/0236169 A1\* 7/2020 Vaddi ............... H04L 67/1012
2022/0086241 A1\* 3/2022 Sharma ............. H04L 67/1097

\* cited by examiner

FIG. 1

CSP Property Table 401

| CSP | Available Space | Speed (MBPS) | Cost/MB ($) |
|---|---|---|---|
| Google Drive | 70% = 0.4 | 10 = 0.7 | 5 = -0.8 |
| OneDrive | 90% = 0.6 | 4 = 0.3 | 1 = -0.2 |

Weights Table 402

| Mode | Available Space | Speed | Cost/MB |
|---|---|---|---|
| Performance | 0.1 | 0.7 | 0.2 |
| Cost-Effective | 0.1 | 0.2 | 0.7 |
| Optimal | 0.2 | 0.4 | 0.4 |

CONTEXT-BASED INTELLIGENT PLACEMENT OF FILES IN AGGREGATED CLOUD STORAGE

CROSS-REFERENCE TO RELATED APPLICATIONS

N/A

BACKGROUND

Cloud storage has become commonly used for storing files. Various cloud storage providers exist such as OneDrive, Google Drive, Dropbox, Box, iCloud, etc. Each cloud storage provider offers different features, and therefore it is common for a user to use multiple cloud storage providers, particularly when the user is part of an enterprise. When multiple cloud storage providers are used, it is also common to use a cloud storage aggregator to provide a combined view of a user's files regardless of which cloud storage provider may store them.

Although a cloud storage aggregator simplifies the interface for accessing files spanning multiple cloud storage providers, it does not address a number of underlying difficulties. For example, an information technology decision maker (ITDM) typically defines a static configuration for a user's create, read, update, and delete (CRUD) operations pertaining to each cloud storage provider that is aggregated. Such a configuration may typically assign a particular cloud storage provider to each folder in the aggregated interface (e.g., OneDrive to be used for files stored in folder-1, Google Drive to be used for files in folder-2, etc.), the maximum amount of cloud storage that can be used for each folder (e.g., 10 GB for folder-1, 5 GB for folder-2, etc.), an input/output limit for CRUD operations pertaining to each cloud storage provider (e.g., 20 input/output operations per second (IOPS) max for folder-1, 10 IPOS max for folder-2, etc.), etc.

When a static configuration is applied to an aggregated interface, a degraded user experience may result. For example, network parameters may routinely change such as when a user connects his or her computing device to a variety of networks (e.g., an office network, a home network, public hotspots, etc.) or experiences different signal strengths while moving around. The user may also be required to selectively use a firewall, VPN, or proxy configurations depending on which type of network he or she is connected to. Cloud service providers may also employ variable billing. For example, a cloud service provider may charge $0.10 per GB up to 10 TB and then $0.50 thereafter. Furthermore, a user may unevenly use the different cloud service providers that are aggregated such as when a folder assigned to one cloud service provider is set as a default. If a user fills up his or her allocation with one cloud storage provider, he or she, or more likely an administrator, may have to manually move files to another could storage provider.

BRIEF SUMMARY

The present invention extends to systems, methods, and computer program products for implementing context-based intelligent placement of files in aggregated cloud storage. A virtual volume can be created to provide an aggregated interface for accessing aggregated cloud storage. When the user attempts to create a file on the virtual volume, the virtual volume can employ a placement algorithm to intelligently select one of the aggregated cloud storage providers to which the request to create the file will be directed. The placement algorithm can consider context of the aggregated cloud storage providers, network metrics, and other factors in its selection. In this way, the aggregated cloud storage can be efficiently used while maximizing the user experience.

In some embodiments, the present invention may be implemented as a method for implementing context-based intelligent placement of files in aggregated cloud storage. An I/O request can be received. The I/O request may be for creating a file on a virtual volume that provides an aggregated interface for accessing aggregated cloud storage. The aggregated cloud storage may include a plurality of cloud storage providers. A placement algorithm can calculate a score for each of the plurality of cloud storage providers. One of the plurality of cloud storage providers can then be selected based on the score calculated for each of the plurality of cloud storage providers. The file can then be created on the selected cloud storage provider.

In some embodiments, the present invention may be implemented as computer storage media storing computer executable instructions which when executed implement a method for performing context-based intelligent placement of files in aggregated cloud storage. A virtual volume can be created on a user computer device that provides an aggregated interface for accessing aggregated cloud storage that includes a plurality of cloud storage providers. In response to receiving requests to create files in the aggregated cloud storage, a placement algorithm can be used to calculate a score for each of the plurality of cloud storage providers. For each request to create files in the aggregated cloud storage, one of the plurality of cloud storage providers can be selected based on the score calculated for each of the plurality of cloud storage providers. Each of the files can then be created on the respective selected cloud storage provider.

In some embodiments, the present invention may be implemented as method for implementing context-based intelligent placement of files in aggregated cloud storage. An agent executing on a user computing device can receive a plurality of properties of a plurality of cloud storage providers. The agent can create a virtual volume on the user computing device that provides an aggregated interface for aggregated cloud storage. The aggregated cloud storage includes the plurality of cloud storage providers. The agent can also obtain a plurality of weights for the plurality of properties. In response to receiving requests to create files on the virtual volume, a placement algorithm can use the plurality of properties and the plurality of weights to calculate a score for each of the plurality of cloud storage providers. For each request to create files in the aggregated cloud storage, one of the plurality of cloud storage providers can be selected based on the score calculated for each of the plurality of cloud storage providers. Each of the files can then be created on the respective selected cloud storage provider.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "aggregated cloud storage" shall be construed as including scenarios where a user has access to more than one cloud storage provider or more than one account with a single cloud storage provider for purposes of storing files. The term "aggregated interface" shall be construed as an interface, such as a folder exposed on a virtual volume, by which a user may store or access files in aggregated cloud storage.

Figure 1:
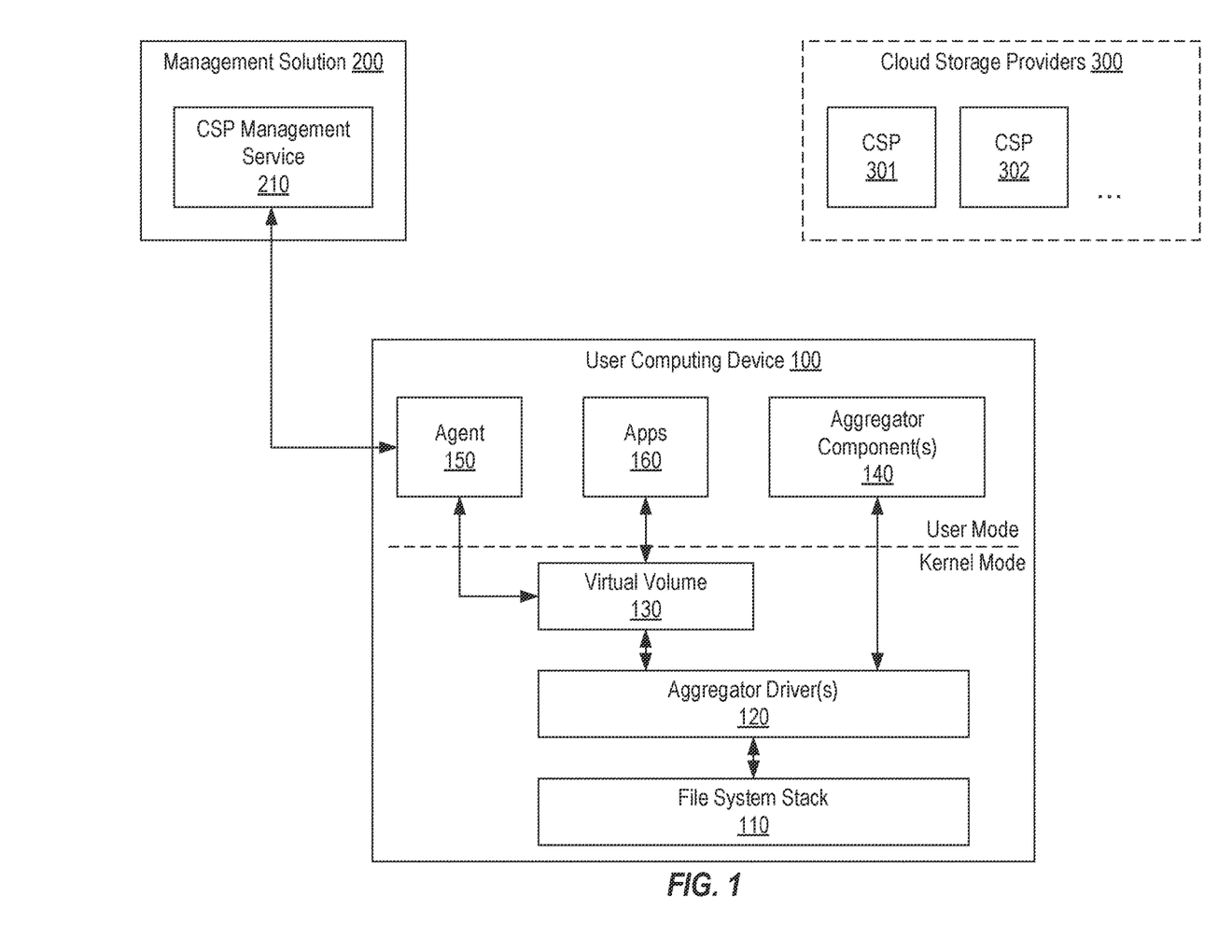
FIG. 1 provides an example of a computing environment in which embodiments of the present invention may be implemented.

FIG. 1 provides an example of a computing environment in which embodiments of the present invention may be implemented. The computing environment includes a user computing device 100, a management solution 200, and cloud storage providers 300. In a typical scenario, there may be multiple user computing devices 100 which may be managed from management solution 200 such as the user computing devices of an enterprise or company. User computing device 100 can be a desktop, a laptop, a thin client, a tablet, a smart phone, or any other computing device that a user may use to access cloud storage.

User computing device 100 is shown as having a file system stack 110, one or more aggregator drivers 120, a virtual volume 130, one or more aggregator component(s) 140, an agent 150, and apps 160. Aggregator driver(s) 120 and aggregator component(s) 140 can represent kernel-mode and user-mode components respectively that can be leveraged to implement aggregated cloud storage. As one example only, aggregator driver(s) 120 and aggregator component(s) 140 could be part of the WinFuse suite of software components that allow a FUSE file system to run on Windows. Virtual volume 130 can be created by agent 150 by leveraging aggregator driver(s) 120 and aggregator component(s) 140 and can provide an aggregated interface for accessing aggregated cloud storage. For example, user computing device 100 may be configured to employ cloud storage provider (CSP) 301 and CSP 302 to store and access files, and virtual volume 130 can provide an aggregated interface (e.g., a folder) by which files stored in CSP 301 and CSP 302 are created and accessed. Apps 160 can represent any application or other component that may be capable of creating or accessing files on user computing device 100.

Agent 150 can be deployed on user computing device 100 to enable user computing device 100 to be managed from management solution 200 and to coordinate the context-based intelligent placement of files in aggregated cloud storage. For example, agent 150 can be a user-mode service that invokes functionality of aggregator driver(s) 120 and aggregator component(s) 140 and interfaces with virtual volume 130 and a CSP management service 210 that forms part of management solution 200. Management solution 200 can represent any cloud-based or otherwise network accessible management solution.

As an overview, agent 150 can create virtual volume 130 to implement aggregated cloud storage and can configure virtual volume 130 to perform context-based intelligent placement of files that apps 160 attempt to create in the aggregated cloud storage. CSP management service 210 can provide information that agent 150 may use for this purpose. Agent 150 may also leverage aggregator component(s) 140 to obtain additional information for this purpose. By implementing context-based intelligent placement of files in aggregated cloud storage the aggregated cloud storage can be efficiently used while maximizing the user experience.

Figure 2:
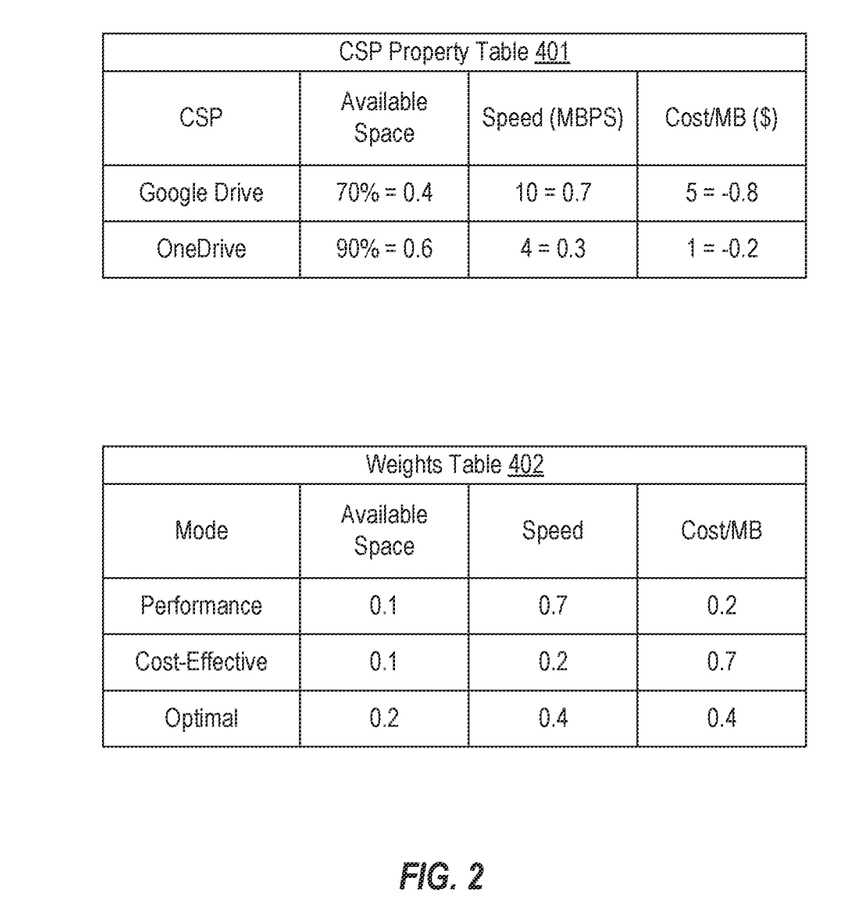
FIG. 2 provides an example of data structures that could be used to implement embodiments of the present invention.

FIG. 2 provides an example of data structures that may be used to implement embodiments of the present invention. A CSP property table 401 may be used to identify each cloud storage provider that is available to the user, or in other words, the cloud storage providers that may be aggregated. In this example, it is assumed that the user of user computing device 100 has access to Google Drive and OneDrive, which can be considered CSP 301 and CSP 302 respectively. CSP property table 401 also defines properties of each cloud storage provider such as the available space, the speed (or maximum rate of data transfer), and the usage cost (e.g., the cost per MB stored). In the depicted example, the available space may be represented as a percentage of the total space (e.g., 70% for Google Drive and 90% for OneDrive) and may be specific to the user, to a group of users, to an entire enterprise, etc. These properties may typically be defined by an ITDM as part of a subscription with the cloud storage providers.

CSP property table 401 also defines a normalized value for each property. The normalized values for a property across each cloud storage provider may sum to 1 or −1. For example, the normalized values assigned to the available space properties may be 0.4 and 0.6 for Google Drive and OneDrive respectively.

FIG. 2 also shows a weights table 402 which defines a number of modes (e.g., performance, cost-effective, and optimal) and defines, for each mode, a set of weights for each property in CSP property table 401. For example, for the performance mode, the weights for the available space, speed and cost/MB properties are 0.1, 0.7, and 0.2 respectively. Each set of weights may sum to 1.

Figure 3A:
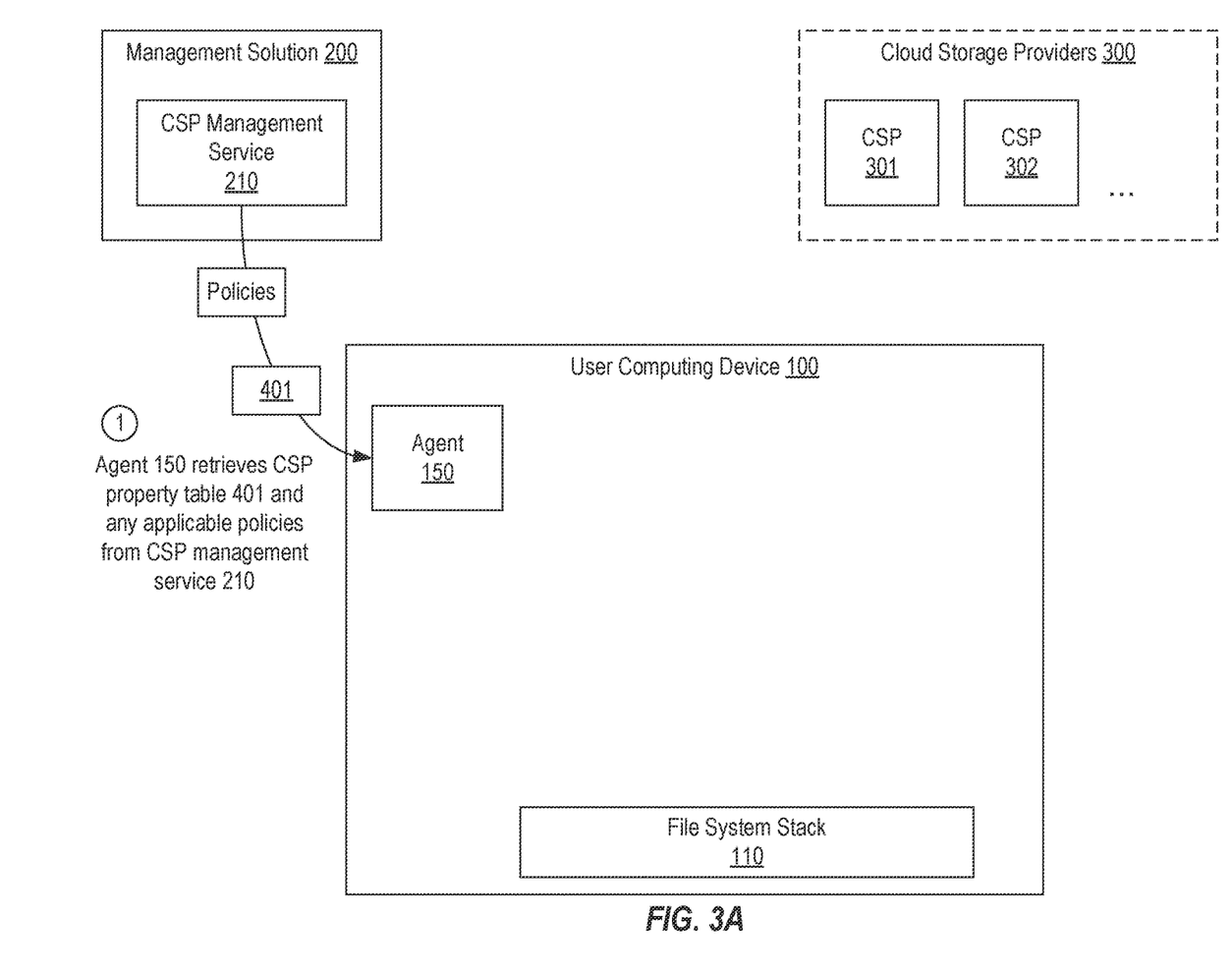
FIGS. 3A-3C provide an example of how a virtual volume may be created as part of implementing aggregated cloud storage to enable context-based intelligent placement of files in the aggregated cloud storage in accordance with embodiments of the present invention.
Figure 3B:
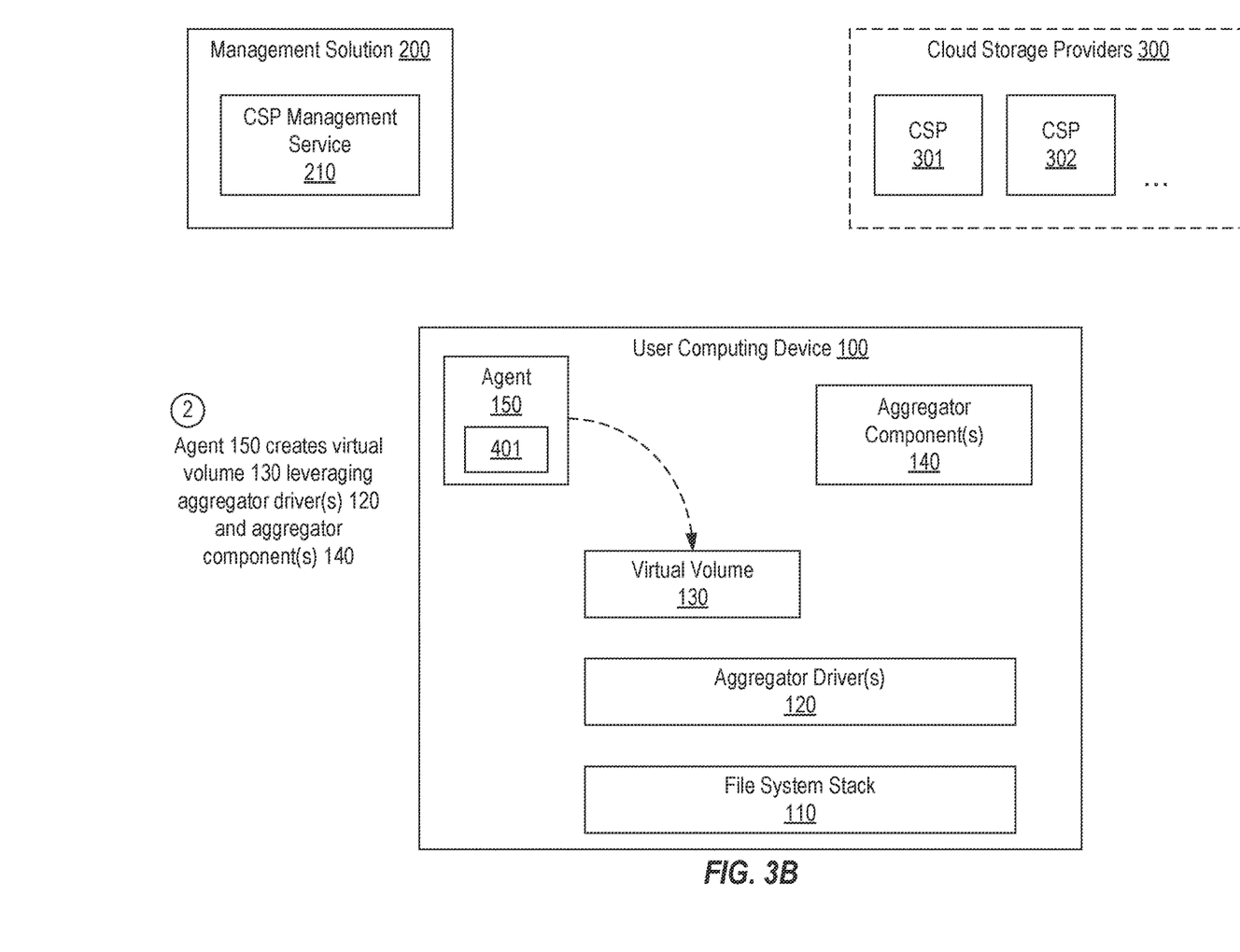
Figure 3C:
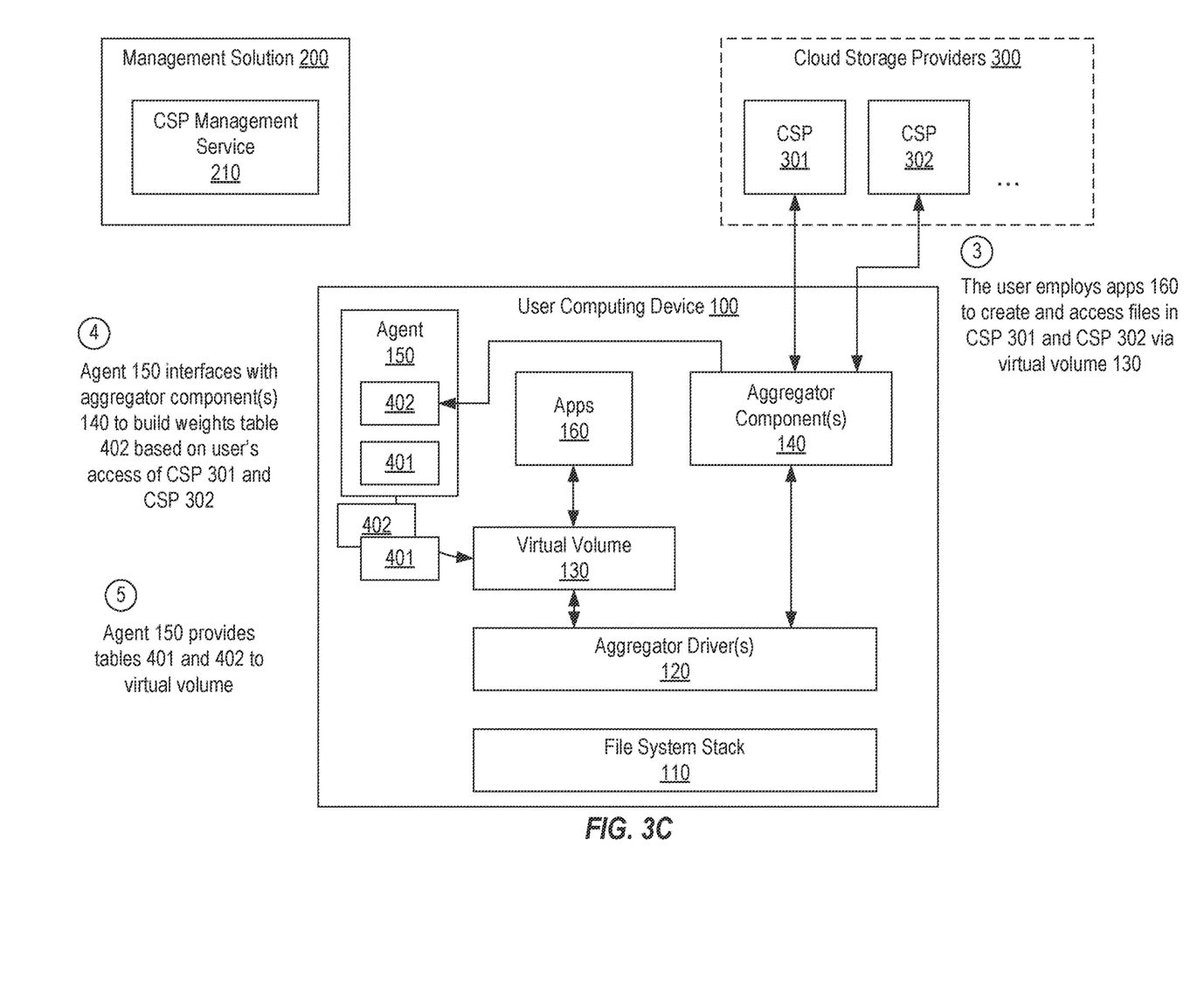

FIGS. 3A-3C provide an example of functionality that can be performed to enable context-based intelligent placement of files in aggregated cloud storage. In FIG. 3A, it is assumed that agent 150 has been loaded on user computing device 100, such as during startup, and that virtual volume 130 has not yet been created. As part of its initialization and in step 1, agent 150 can communicate with CSP management service 210 to retrieve CSP property table 401 and any applicable policies. In some embodiments, CSP management service 210 may be configured to push CSP property table 401 to agent 150 whenever any changes are made to the table such as additions or deletions of CSPs available to the user, adjustments to the properties, or adjustments to the normalized values assigned to the properties. The policies could be used to control or influence agent 150's selection of a mode as is further described below.

Turning to FIG. 3B, in step 2, agent 150 can create virtual volume 130 to function as an aggregated interface for aggregated cloud storage. Based on CSP property table 401 defining two CSPs, agent 150 can configure virtual volume 130 to function as an aggregated interface for storing and accessing files in CSP 301 and CSP 302 (which are assumed to be Google Drive and OneDrive). For example, agent 150 can leverage aggregator driver(s) 120 and aggregator component(s) 140 to aggregate CSP 301 and CSP 302 into the aggregated interface made accessible to the user via virtual volume 130. Once virtual volume 130 is created, the user will be able to access CSP 301 and CSP 302 through the aggregated interface. For example, in a Windows-based implementation, virtual volume 130 may appear as a typical folder in File Explorer thus abstracting from the user the fact that files stored in the folder are actually stored in CSP 301 or CSP 302.

Turning to FIG. 3C, and as represented as step 3, it is assumed that the user uses apps 160 to create and access files in CSP 301 and CSP 302 via virtual volume 130. Because of the aggregated interface that virtual volume 130 provides, the user likely will not know whether a particular file is stored in CSP 301 or CSP 302. Instead, apps 160 will generate I/O requests that target virtual volume 130 and such requests will be routed through aggregator driver(s) 120 and aggregator component(s) 140 and to CSP 301 or CSP 302 as opposed to being delivered down to file system stack 110 as would be the case if the targeted files were stored locally on user computing device 100.

In step 4, which may be repeatedly performed, agent 150 can interface with aggregator component(s) 140 as part of building/updating weights table 402. For example, because I/O requests pertaining to CSP 301 and CSP 302 are routed through aggregator component(s) 140, or more specifically, because aggregator component(s) 140 perform the network communications for accessing CSP 301 and CSP 302, aggregator component(s) 140 can monitor metrics such as the download and upload speeds and latency for CSP 301 and CSP 302. Notably, the user of user computing device 100 may connect user computing device 100 to a variety of networks with many different network configurations and therefore these metrics may vary greatly. By leveraging aggregator component(s) 140, agent 150 can obtain metrics in real-time to ensure that weights table 402 is accurate for the current network configuration and performance.

Agent 150 may generate the weights in weights table 402 based on the metrics received from aggregator component(s) 140 as well as the values in CSP property table 401. For example, if the actual download/upload speed for CSP 301 and CSP 302 as reported by aggregator component(s) 140 is much less than the maximum speed for CSP 301 and CSP 302 as defined in CSP property table 401, agent 150 may reflect this in the weight assigned to the speed property in weights table 402.

In step 5, agent 150 can deliver CSP property table 401 and weights table 402 to virtual volume 130 so that these tables may be used to implement context-based intelligent placement of files with CSP 301 and CSP 302. In this context, virtual volume 130 should be considered as encompassing the volume itself as well as supporting components/functionality (e.g., a filter driver) for implementing the techniques described herein. Step 5 can be repeated whenever CSP property table 401 and/or weights table 402 is updated to ensure that virtual volume 130 has the most up-to-date information for performing context-based intelligent placement of files in the aggregated CSP 301 and CSP 302.

Figure 4A:
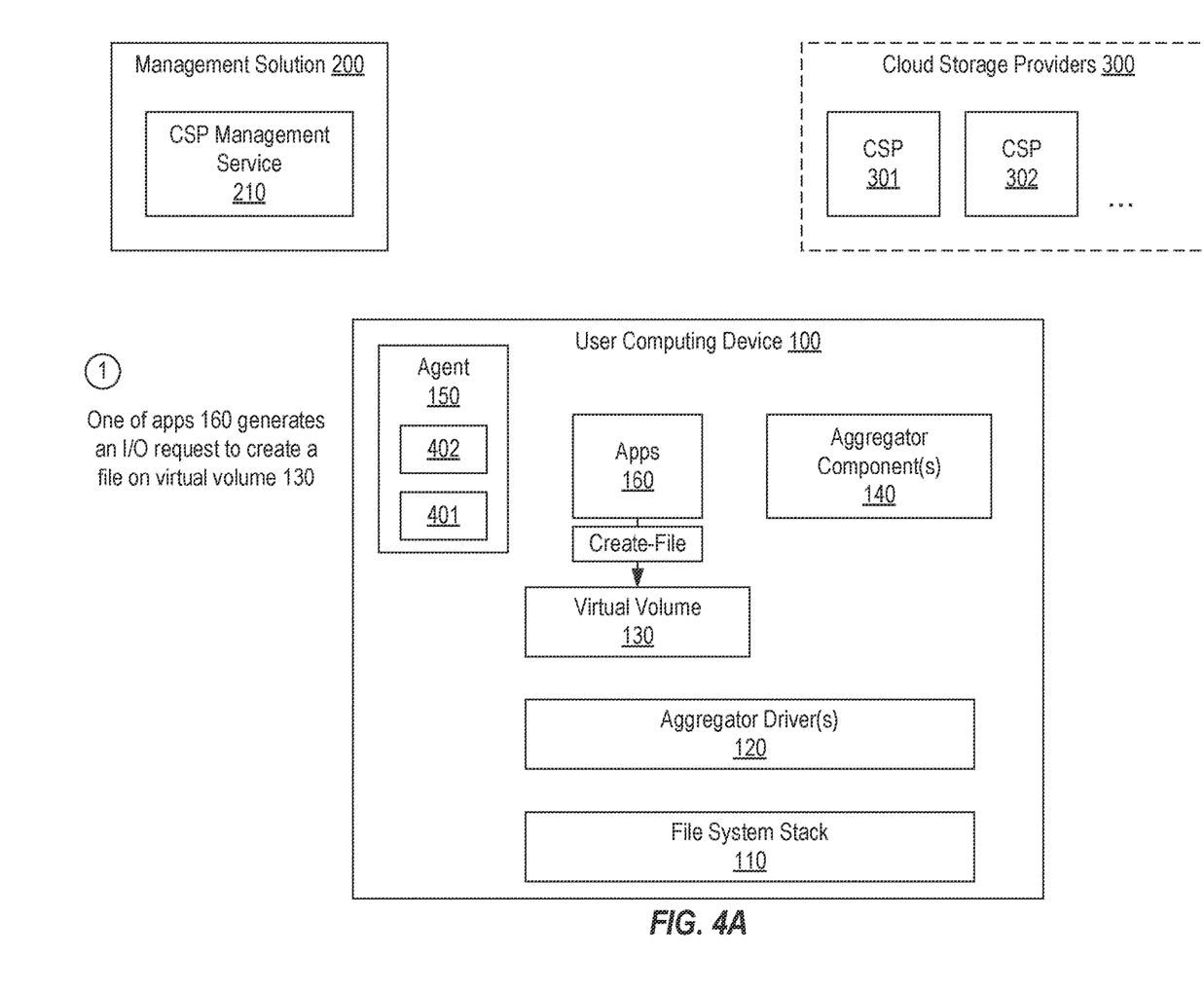
FIGS. 4A-4C provide an example of how files can be intelligently placed in aggregated cloud storage based on context in accordance with embodiments of the present invention.
Figure 4B:
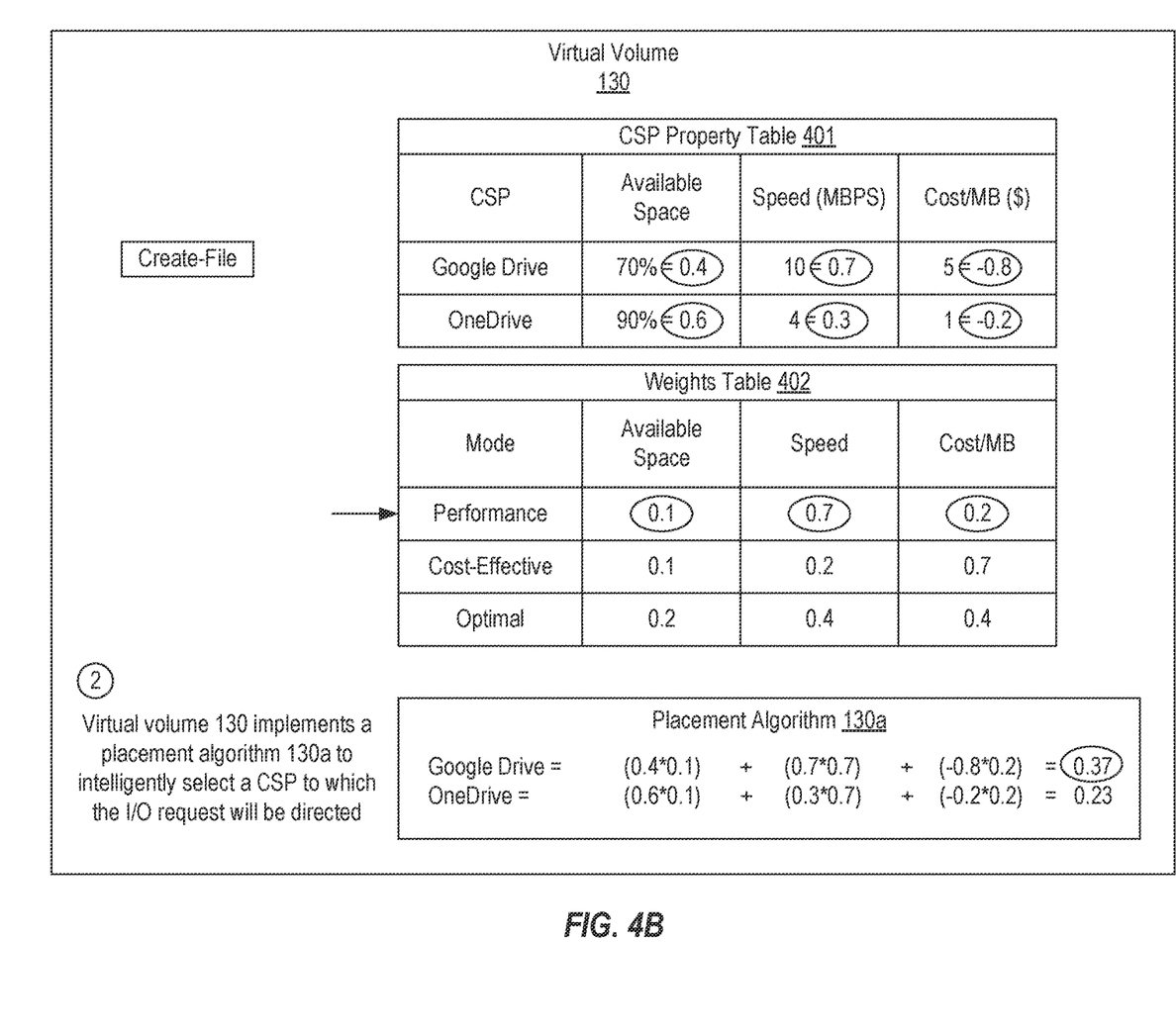
Figure 4C:
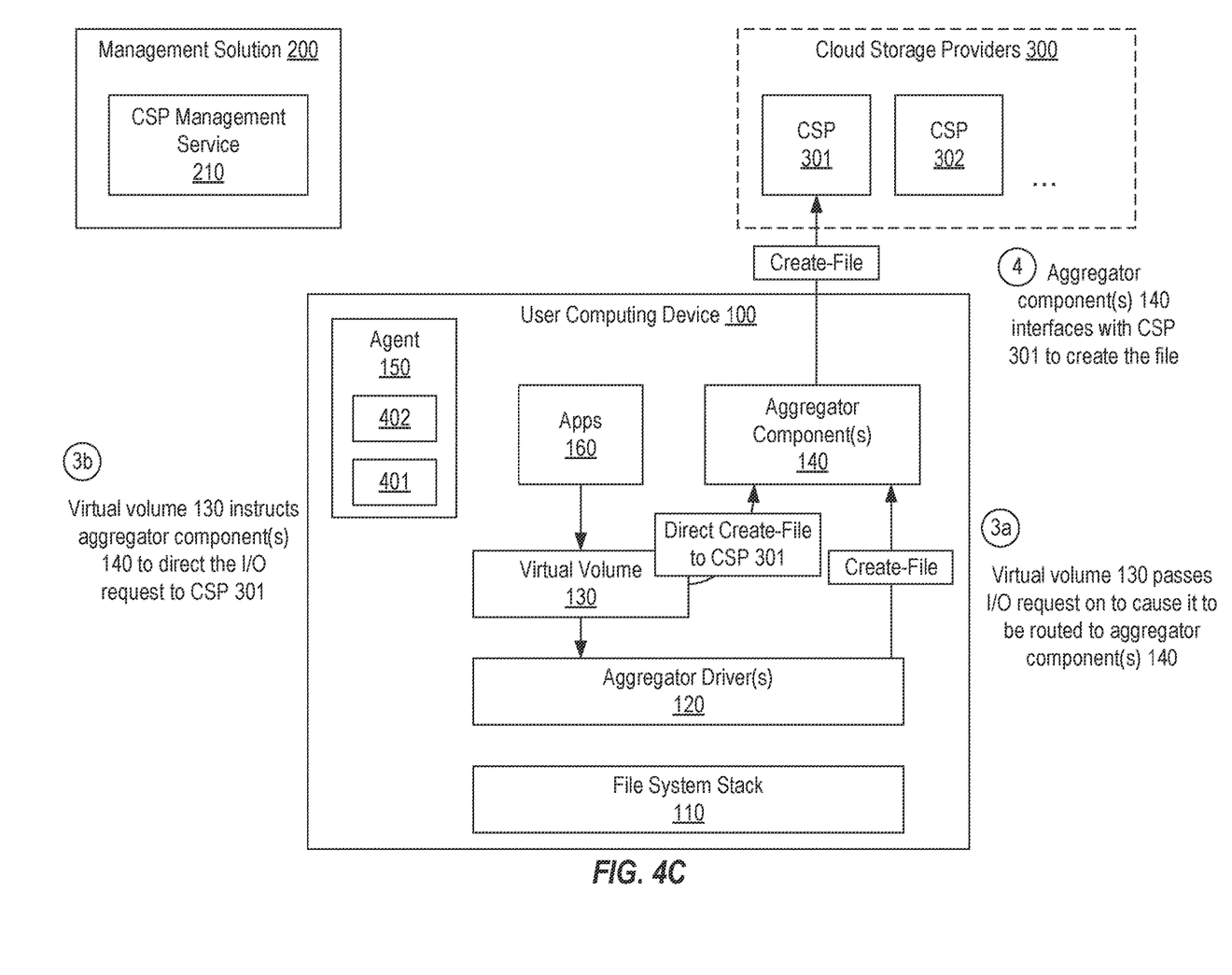

FIGS. 4A-4C provide an example of how virtual volume 130 can implement context-based intelligent placement of a file in aggregated cloud storage. In this example, it is assumed that CSP property table 401 and weights table 402 have been provided to virtual volume 130 and have the values reflected in FIG. 2. It is also assumed that, in step 1, one of apps 160 generates an I/O request to create a file on virtual volume 130 (Create-File).

Turning to FIG. 4B, virtual volume 130 is shown as having received the I/O request. Virtual volume 130 can process the request such as to determine what type of request it is. In the case where an I/O request targets an existing file, virtual volume 130 can pass the I/O request along given that it must be accessed in the CSP in which it is stored. In contrast, in the case of an I/O request to create a new file, and as represented in step 2, virtual volume 130 can implement a placement algorithm 130a to intelligently select one of the aggregated CSPs to which the I/O request will be directed. It will be assumed that virtual volume 130 has determined that the performance mode should be implemented. As suggested above, such a determination could be based on policy (e.g., requiring optimal mode when user computing device 100 is connected to a home network but allowing performance mode when connected to a work network), current network metrics, or possibly other factors.

As represented in FIG. 4B, placement algorithm 130a can use the normalized values of the properties in CSP property table 401 and the weights defined in weights table 402 for the selected mode to calculate a score for each of the aggregated CSPs. For example, placement algorithm 130a may multiply each normalized value by the corresponding weight and then sum the products to yield the score. In the depicted example, placement algorithm 130a calculates a score of 0.37 for Google Drive (CSP 301) and a score of 0.23 for OneDrive (CSP 302). Accordingly, virtual volume 130 may select CSP 301 to be the target of the I/O request to create the file given that its score is higher. In comparison, if the cost-effective mode were selected, placement algorithm 130a would generate scores of –0.38 for Google Drive and –0.02 for OneDrive resulting in virtual volume 130 selecting OneDrive to be the target of the I/O request. In this way, virtual volume 130 can intelligently select a CSP on which a file will be stored based on the current context of a user computing device and the CSPs available to the user computing device. Notably, if network metrics were to change, agent 150 could update weights table 402 and provide it to virtual volume 130 (as represented in steps 4 and 5 of FIG. 3C) which in turn could result in placement algorithm 130a selecting a different CSP for another I/O request to create a file even though all other factors may remain unchanged.

Turning to FIG. 4C, in conjunction with selecting CSP 301 to be the target of the I/O request, in step 3a, virtual volume 130 can pass the I/O request on thereby causing it to be routed to aggregator component(s) 140. Also, in step 3b, and in response to selecting CSP 301, virtual volume 130 can instruct aggregator component(s) 140 to direct the I/O request to CSP 301. For example, virtual volume 130 could pass an identifier of the I/O request and an identifier of CSP 301 to aggregator component(s) 140. Finally, in step 4 and based on the instructions from virtual volume 130, aggregator component(s) 140 could employ the interface exposed by CSP 301 to cause the file to be created and stored on CSP 301. In this way, the file has been intelligently placed on CSP 301.

Figure 5:
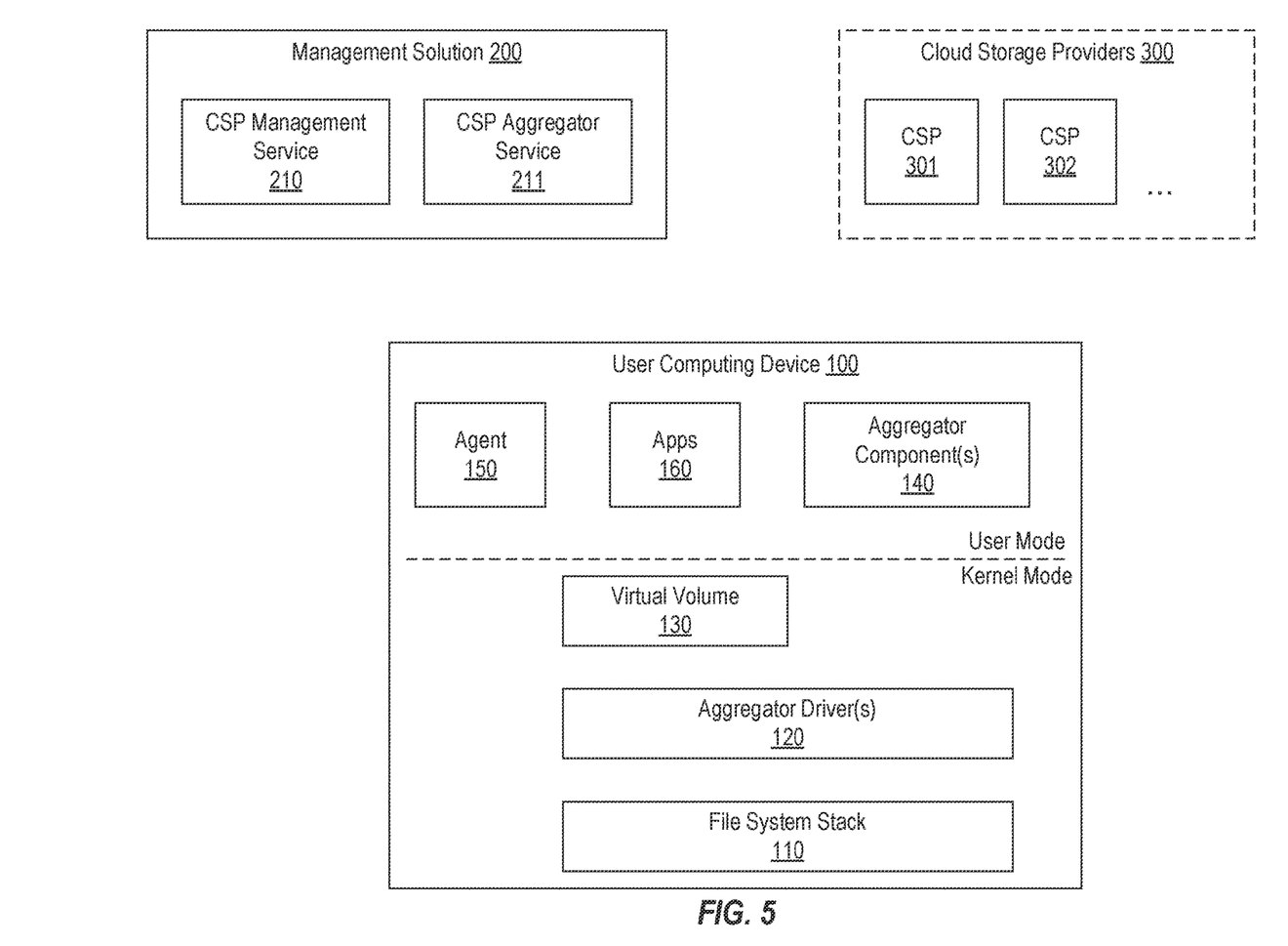
FIG. 5 provides an example of a computing environment in which a cloud storage provider aggregator service is employed to provide additional functionality.

FIG. 5 illustrates a variation of the computing environment shown in FIG. 1. In FIG. 5, management solution 200 includes CSP aggregator service 211 which may perform the above-described functionality for intelligently placing files in aggregated cloud storage. Such embodiments may be employed at any time but may typically be performed when user computing device 100 is a mobile device to avoid consuming battery life by iteratively implementing placement algorithm 130*a* or when the performance of user computing device 100 may otherwise be degraded. In some embodiments, CSP aggregator service 211 may be selectively used based on a state of user computing device 100 (e.g., whether user computing device 100 is running on battery).

When CSP aggregator service 211 is used, CSP property table 401 and weights table 402 may be maintained at CSP aggregator service 211 and aggregator component(s) 140 may be configured to direct I/O requests to CSP aggregator service 211 (or at least I/O requests that create files). CSP aggregator service 211 can then implement context-based intelligent placement of files in aggregated cloud storage in the same manner as virtual volume 130 is described as doing so above.

In some embodiments, virtual volume 130 and/or CSP aggregator service 211 may implement or otherwise use machine learning techniques to refine weights table 402 and/or the selection of a mode. Such machine learning techniques may consider network metrics, file access times, and other parameters experienced across many user computing devices to ensure that the context-based intelligent placement of files maximizes the user experience.

In some embodiments, CSP aggregator service 211 may be leveraged to intelligently migrate files between aggregated CSPs. For example, if network metrics are degraded for one CSP when user computing device 100 is in a particular location (e.g., when at home where a branch-cache server is not available for one of the CSPs), CSP aggregator service 211 may automatically migrate files stored on the CSP to another one of the aggregated CSPs. In some embodiments, CSP aggregator service 211 may identify a set of the user's recently accessed files stored on the CSP with the degraded performance and migrate the recently accessed files to another CSP. For non-recently used files stored on the CSP with the degraded performance, CSP aggregator service 211 can create symbolic links in virtual volume 130 and then, when the user accesses one of these files, may migrate the file to another CSP. In this way, the files that the user is most likely to access may be automatically migrated from one CSP with degraded performance while other files may be migrated from the CSP with degraded performance only if the user accesses them.

In summary, embodiments of the present invention enable files to be intelligently stored in aggregated cloud storage based on context of the cloud storage providers that are aggregated and the user computing device from which the aggregated cloud storage is accessed. Such techniques can ensure that cloud storage is efficiently used, and that the user experience is maximized when a user accesses the cloud storage via an aggregated interface.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for implementing context-based intelligent placement of files in aggregated cloud storage, the method comprising:
    obtaining, on a user computing device, a cloud storage provider property table that defines a plurality of properties for each of a plurality of cloud storage providers, the plurality of properties including available space on the respective cloud storage provider, a network speed for the respective cloud storage provider, and a cost for storing files on the respective cloud storage provider;
    obtaining on the user computing device, a weights table that defines a number of modes and, for each mode, a set of weights for each of the plurality of properties defined in the cloud storage provider property table;
    creating, on the user computing device, a virtual volume to function as an aggregated interface for aggregated cloud storage, the aggregated cloud storage including cloud storage provided by each of the plurality of cloud storage providers;

receiving an I/O request, which is generated by a first application executing on the user computing device, for creating a file on the virtual volume that was created on the user computing device;

in response to receiving the I/O request, using a placement algorithm to calculate a score for each of the plurality of cloud storage providers, wherein the placement algorithm calculates the score for each of the plurality of cloud storage providers using the plurality of properties and the set of weights corresponding to a selected mode;

selecting the cloud storage of one of the plurality of cloud storage providers in which the file is to be created based on the score calculated for each of the plurality of cloud storage providers; and interfacing, by the virtual volume, with one or more aggregator components to cause the file to be created in the cloud storage of the selected cloud storage provider such that the I/O request to create the file on the virtual volume results in the file being created in the cloud storage of the selected cloud storage provider.

2. The method of claim 1, wherein the mode is selected based on policy.

3. The method of claim 1, wherein the modes include a performance mode, a cost-effective mode, and an optimal mode.

4. The method of claim 1, wherein the plurality of properties are defined as normalized values.

5. The method of claim 1, wherein selecting the cloud storage of one of the plurality of cloud storage providers in which the file is to be created based on the score calculated for each of the plurality of cloud storage providers comprises selecting the cloud storage of the cloud storage provider with the highest score.

6. The method of claim 1, further comprising:
monitoring network metrics;
based on the network metrics, updating the set of weights for at least one of the modes;
receiving an additional I/O request for creating an additional file on the virtual volume;
using the placement algorithm to calculate the score for each of the plurality of cloud storage providers, the placement algorithm using the updated set of weights;
selecting the cloud storage of a different one of the plurality of cloud storage providers based on the score calculated for each of the plurality of cloud storage providers using the updated set of weights; and
causing the additional file to be created in the cloud storage of the selected different cloud storage provider.

7. The method of claim 1, further comprising:
receiving updates to the plurality of properties;
receiving an additional I/O request for creating an additional file on the virtual volume;
using the placement algorithm to calculate the score for each of the plurality of cloud storage providers, the placement algorithm using the updated plurality of properties;
selecting the cloud storage of a different one of the plurality of cloud storage providers based on the score calculated for each of the plurality of cloud storage providers using the updated plurality of properties; and
causing the additional file to be created in the cloud storage of the selected different cloud storage provider.

8. The method of claim 1, further comprising:
detecting that a first cloud storage provider of the plurality of cloud storage providers has degraded performance relative to a second cloud storage provider of the plurality of cloud storage providers; and
migrating a first set of files stored in the cloud storage of the first cloud storage provider to the cloud storage of the second cloud storage provider.

9. The method of claim 8, wherein the first set of files are a user's recently accessed files.

10. The method of claim 9, further comprising:
creating symbolic links on the virtual volume for a second set of files stored in the cloud storage of the first cloud storage provider; and
migrating a file from the second set of files to the cloud storage of the second cloud storage provider only when the user accesses the file.

11. The method of claim 1, wherein the virtual volume uses the placement algorithm to calculate the score for each of the plurality of cloud storage providers.

12. The method of claim 1, wherein a cloud storage provider service hosted on a management solution uses the placement algorithm to calculate the score for each of the plurality of cloud storage providers.

13. One or more computer storage media storing computer executable instructions which when executed implement a method for implementing context-based intelligent placement of files in aggregated cloud storage, the method comprising:
obtaining, on a user computing device, a cloud storage provider property table that defines a plurality of properties for each of a plurality of cloud storage providers, the plurality of properties including available space on the respective cloud storage provider, a network speed for the respective cloud storage provider, and a cost for storing files on the respective cloud storage provider;
obtaining, on the user computing device, a weights table that defines a number of modes and, for each mode, a set of weights for each of the plurality of properties defined in the cloud storage provider property table;
creating, on the user computing device, a virtual volume to function as an aggregated interface for aggregated cloud storage, the aggregated cloud storage including cloud storage provided by each of the plurality of cloud storage providers;
receiving an I/O request, which is generated by a first application executing on the user computing device, for creating a file on the virtual volume that was created on the user computing device;
in response to receiving the I/O request, using a placement algorithm to calculate a score for each of the plurality of cloud storage providers, wherein the placement algorithm calculates the score for each of the plurality of cloud storage providers using the plurality of properties and the set of weights corresponding to a selected mode;
selecting the cloud storage of one of the plurality of cloud storage providers in which the file is to be created based on the score calculated for each of the plurality of cloud storage providers; and
interfacing, by the virtual volume, with one or more aggregator components to cause the file to be created in the cloud storage of the selected cloud storage provider such that the I/O request to create the file on the virtual volume results in the file being created in the cloud storage of the selected cloud storage provider.

14. The computer storage media of claim 13, wherein the mode is selected based on policy.

15. The computer storage media of claim 13, wherein the modes include a performance mode, a cost-effective mode, and an optimal mode.

16. The computer storage media of claim 13, wherein the method further comprises:
- monitoring network metrics;
- based on the network metrics, updating the set of weights for at least one of the modes;
- receiving an additional I/O request for creating an additional file on the virtual volume;
- using the placement algorithm to calculate the score for each of the plurality of cloud storage providers, the placement algorithm using the updated set of weights;
- selecting the cloud storage of a different one of the plurality of cloud storage providers based on the score calculated for each of the plurality of cloud storage providers using the updated set of weights; and
- causing the additional file to be created in the cloud storage of the selected different cloud storage provider.

17. A method for implementing context-based intelligent placement of files in aggregated cloud storage, the method comprising:
- obtaining, on a user computing device, a cloud storage provider property table that defines a plurality of properties for each of a plurality of cloud storage providers, the plurality of properties including available space on the respective cloud storage provider, a network speed for the respective cloud storage provider, and a cost for storing files on the respective cloud storage provider;
- obtaining, on the user computing device, a weights table that defines a number of modes including a performance mode, a cost-effective mode, and an optimal mode and, for each mode, a set of weights for each of the plurality of properties defined in the cloud storage provider property table;
- obtaining a policy which defines criteria for selecting one of the modes;
- creating, on the user computing device, a virtual volume to function as an aggregated interface for aggregated cloud storage, the aggregated cloud storage including cloud storage provided by each of the plurality of cloud storage providers;
- receiving, at the virtual volume, an I/O request, which is generated by a first application executing on the user computing device, for creating a file on the virtual volume that was created on the user computing device;
- in response to receiving the I/O request, using the policy to select one of the modes;
- using, by the virtual volume, a placement algorithm to calculate a score for each of the plurality of cloud storage providers, wherein the placement algorithm calculates the score for each of the plurality of cloud storage providers using the plurality of properties and the set of weights corresponding to the selected mode;
- selecting, by the virtual volume, the cloud storage of one of the plurality of cloud storage providers in which the file is to be created based on the score calculated for each of the plurality of cloud storage providers; and
- interfacing, by the virtual volume, with one or more aggregator components to cause the file to be created in the cloud storage of the selected cloud storage provider such that the I/O request to create the file on the virtual volume results in the file being created in the cloud storage of the selected cloud storage provider.

18. The method of claim 17, further comprising:
- detecting, by a cloud storage provider aggregator service that executes on a management solution separate from the user computing device, that a first cloud storage provider of the plurality of cloud storage providers has degraded performance relative to a second cloud storage provider of the plurality of cloud storage providers;
- determining that the virtual volume has caused a first set of files to be stored in the cloud storage of the first cloud storage provider and that a user of the user computing device has recently accessed the first set of files; and
- based on the detection and the determination, automatically migrating the first set of files to the cloud storage of the second cloud storage provider.

* * * * *